United States Patent Office 2,924,614
Patented Feb. 9, 1960

2,924,614
PROCESS OF REACTING METAL ALCOHOLATES WITH DIKETENES

Martin Reuter, Frankfurt am Main, Germany, assignor to Farbwerke Hoechst Aktiengesellschaft vormals Meister Lucius & Brüning, Frankfurt am Main, Germany, a corporation of Germany No Drawing. Application September 27, 1954
Serial No. 458,707

Claims priority, application Germany October 2, 1953

17 Claims. (Cl. 260—429.3)

The present invention relates to organic metal compounds and a process of preparing them.

It is known that diketene can readily be reacted with compounds containing a reactive hydrogen atom, for example with alcohols or amines. Derivatives of the acetoacetic acid such as acetoacetic acid ester or acetoacetic acid amides are thus formed.

Now, I have found that valuable organic metal compounds can be prepared by reacting metal alcoholates with aliphatic diketenes in the presence or absence of inert solvents or diluents and, if desired, heating the reaction product to an elevated temperature and/or by allowing exchangeable substances, such as water, alcohols, organic acids or isocyanates, to act on the reaction product insofar as they still contain original alcoholic radicals bound in an alcoholate-like manner.

The process can be carried out by reacting a priori on each other the quantities of the reaction components which come into consideration. It may, however, also be carried out in such a manner that one of the reaction components is first reacted with part of the other component and the remainder of the latter is added at a subsequent stage of reaction and/or when the reaction product is heated to a raised temperature.

As diketenes there may be mentioned the dimeric ketenes of the type $(RCH=C=O)_2$ or

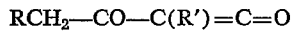

or the cyclic formulations thereof, in which R and R' stand for hydrogen or alkyl radicals, such as diketene $C_4H_4O_2$, dimethyl-diketene, didecyl-diketene, dihexadecyl-diketene, dimeric ketenes from naphthenic acids, resin acids etc. Mixtures of diketenes can likewise be used. Diketene itself or the dialkyl derivatives thereof with alkyl groups of lower or intermediate molecular weight are preferably used.

As alcoholates there are suitable all organic metal compounds in which about 0.2–1.0 equivalent of any hydrocarbon radical is bound through oxygen on 1 equivalent of the metal atom. The alcoholates of trivalent or tetravalent metals are especially valuable reaction products. The method of preparation of the metal alcoholates has no influence on the process of the present invention. They may be prepared in known manner, for example by reacting the metals directly with the anhydrous or weakly hydrous alcoholates, as it is known, for example with magnesium, calcium, or aluminum. They may furthermore be obtained in known manner by reacting— if desired in successive portions—anhydrous halides of polyvalent metals such, for example as aluminum, iron, chromium, zinc, titanium, or zirconium, with alcohols in the presence of alkaline agents such as alkaline metals, alkaline alcoholates, ammonia or amines. They may also be prepared in known manner by reacting—if desired in successive portions—suitable anhydrous metal halides such as aluminum chloride, or titanium chloride, with ethylene oxides. In addition to the monomeric metal alcoholates there come into consideration as starting materials the so-called polymeric metal alcoholates, which are obtained from the monomers by thermal and/or hydrolytic treatment and simultaneously splitting off the alkoxy radicals and linking together the metals by way of oxygen atoms.

As alcohols there come into consideration mono- and bivalent groups of the aliphatic, cycloaliphatic, aromatic and heterocyclic series which may also contain inert substituents such, for example as chlorine atoms, and the carbon chain of which may be interrupted by hetero atoms, such as oxygen or sulfur. Ethanol, isopropanol, butanol, cyclohexanol, 2.5-hexanediol, diglycol, benzyl alcohol, furfuryl alcohol are mentioned as examples.

Instead of the metal alcoholates there can be used the reaction products of polyhydric metal alcoholates with less than the molecular theoretical quantities of volatile organic substances capable of forming complex compounds, such as keto-enol compounds or the known carbon dioxide- or sulfur dioxide addition compounds of the metal alcoholates. Polyhydric metal alcoholates in which some of the alkoxy radicals have already been reacted with acids prior to the action of the diketenes are also suitable as starting materials.

For the process of the present invention, the alcoholates of trivalent or tetravalent metals, which can be derived from monohydric lower molecular weight aliphatic alcohols, are prefered.

The exchangeable substances that are operable in the method of the invention include isocyanates and compounds which contain hydroxy groups. There may be mentioned, for example: water, alcohols, especially aliphatic alcohols, as for example 2-methyl hexanol-(1); furthermore organic acids. Of special advantage is the application of the high-molecular weight aliphatic and the aromatic carboxylic acids which, if desired, may contain double bonds or be substituted by, for example, hydroxy or alkyl groups. Such acids include acetic acid, butyric acid, capric acid, lauric acid, myristic acid, oleic acid, stearic acid, 12-hydroxy-stearic acid, linolenic acid, benzoic acid, ortho-toluic acid, alpha-naphthoic acid, resin acid, or the like. Instead of the carboxylic acids there may be used the anhydrides and dicarboxylic anhydrides thereof.

The reaction of alcoholates with the diketenes is exothermic and always takes place without splitting off alcoholate groups. The reaction products are odorless and are not allowed to be addition compounds since, in general, they do not split off diketene even at elevated temperatures between about 100° C. and 150° C. In some cases only a small amount of heat is generated on mixing the reaction components and the main amount of heat is set free only on heating the reaction mixture to medium or higher temperatures, for example to temperatures of between about 50° C. and 150° C. In view of the exothermic nature of the reaction, it may perhaps be assumed that the diketene is first converted wholly or partly into an acetoacetic ester with an alcoholate radical. Said ester is bound to the metal in a salt-like manner; furthermore, it may be assumed that the chemical transformations take place at raised temperatures. However, under certain circumstances the possibility of a complex-like preliminary stage has to be taken into consideration for the explanation, since in some cases first only a small reaction of heat sets in on mixing the reaction products.

The proportions in which the metal alcoholates can be reacted with the diketenes can vary within wide limits. An excess, an equivalent quantity or even a smaller quantity of diketene may be used for the reaction. The quantities depend in each case on the purposes for which the product obtained by the reaction is intended. 0.5 mol of diketene on 1 mol of metal alcoholate is generally used. If the reaction products are to be used as hydrophobic agents, about 0.5 mol to 2 mols of diketene are preferably applied.

Insofar as the reaction products of alcoholates and diketene still contain orginal alcohol radicals bound in alcoholate-like manner, they may be replaced wholly or partly by reaction with exchangeable substances. The quantities of exchangeable substances can also be varied within wide limits. If organic acids are applied as exchangeable substances there shall be used for the preparation of hydrophobic agents such compounds as contain, per metal atom, about 0.5–2 acyl groups depending on the valency of the metal.

By the action of small quantities of water in the heat, the reaction products of metal alcoholates and diketenes can be converted into the salts of the acetoacetic esters while alcohol is split off.

Should radicals other than the alkoxy radicals originally present be incorporated into the reaction products, the reaction products can be re-alkoxylated by a process analogous to that used for the re-alkoxylation of metal alcoholates by the action of other alcohols while removing the original alkoxy groups.

Furthermore, the alcoholate groups which remained in these products can be exchanged or reacted with organic acids such, for example, as the carboxylic acids mentioned or the anhydrides thereof according to the known process which is followed with metal alcoholates.

The action of the diketenes on the metal alcoholates generally takes place by mixing the reaction components in the cold, while stirring. The reaction may be carried out at room temperature as well as at elevated temperatures. In some cases it is advisable to complete the reaction by heating the product to medium or elevated temperatures, i. e. to temperatures of between about 50° C. and 200° C., if required, under reduced pressure.

The reaction may advantageously be carried out in the presence of solvents or diluents. Hydrocarbons such as benzene, toluene, xylene, chlorinated hydrocarbons such as carbon tetrachloride, ethers such as diethyl ether, dioxan or the like, ethyl acetate and the like, are for example, suitable solvents or diluents.

If the reaction takes a slow course, it may be accelerated by the addition of substances having a catalytic action. As such substances there come particularly into consideration traces of substances having an alkaline reaction. Among these substances there may be mentioned, for example sodium methylate or the like. The application of tertiary bases such as piperidine hexa-hydrodimethylaniliine, triethylamine and the like are especially suitable.

After the reaction has been finished, the inert solvents which may have been used can be removed by distillation or filtering off with suction.

Depending on the starting materials or the reaction conditions, the products obtained according to the present invention are substances of oily, waxy or solid, crystallized or resin-like consistency. Some of them are readily soluble in a great number of organic solvents such, for example as benzene, xylene, perchlorethylene, test benzine, or isopropanol and some of them are insoluble in organic solvents. Their solubility is often reduced by the application of elevated temperatures of about 100° C. to 200° C.

The products obtained according to the present invention are useful for various purposes, for example as addition products in the lubricant, fuel and paint and varnish industries, and as dispersing agents, for example in organic liquids. The products are also useful, particularly when trivalent or tetravalent metals and aliphatic or aromatic carboxylic acids of high-molecular weight are used in their preparation as hydrophobic agents, for example in organic solvents, preferably with the addition of other hydrophobic organic substances such as paraffin.

The products of the present invention which are insoluble in organic solvents are useful in the plastics industry.

Reaction products of polyhydric metal alcoholates with less than equivalent quantities, for example 0.5–1 mol of diketene per metal atom, are suitable as metal alcoholates which are stable to moisture at room temperature.

The process of the present invention is especially surprising because reactions of the diketenes with substances containing reactive hydrogen atoms are the only ones that have hitherto been known and because such hydrogen atoms are not contained in metal alcoholates. Contrary to the known process of preparing metal salts or complexes of metal alcoholates of acetoacetic esters by the action of the latter on metals or metal salts or metal alcoholates, the process of the present invention has the advantage of avoiding the preparation of the acetoacetic esters.

The following examples serve to illustrate the invention but they are not intended to limit it thereto; the parts being by weight unless otherwise stated, and the relationship of parts by weight to parts by volume being the same as that of the kilogram to the litre.

*Example 1*

0.5 mol of diketene is added, while stirring, to a commercial solution of aluminum ethylate in ethyl acetate (containing about 2 percent of Al) prepared according to the process described in German Patent No. 386,688 and the clear mixture so obtained is heated for half an hour to about 60° C. The clear solution is then stabilized against the action of moisture, since on addition of alcohol of 96 percent strength aluminum hydroxide is no longer separated as before the reaction with diketene.

*Example 2*

252 parts of diketene are added in portions, while stirring and externally cooling, to 162 parts of aluminum ethylate in 1000 parts of xylene whereby the temperature of the reaction mixture rises to about 30° C. and a clear solution is formed. The solvent is then removed by distilling off under reduced pressure. The distillation residue solidifies on cooling and after distillation under highly reduced pressure the known aluminum triacetoacetic ester is obtained in a good yield boiling at 165° C. under 0.5 mm. pressure and melting at 78° C.

If the reaction is carried out at a temperature ranging from between about 80° C. and about 120° C. there is obtained, after having distilled off the solvent, a resinous distillation residue which does not yield an aluminum triacetoacetic ester on distillation under highly reduced pressure, but decomposes while gas is split off. The resinous reaction product is soluble in xylene and perchlorethylene.

*Example 3*

168 parts of diketene are added dropwise, while stirring, to a solution of 327 parts of zirconium tetraisopropylate (prepared according to the process described by Bradley from zirconium-oxy-chloride by way of the pyridine complex), in 1000 parts of xylene. The temperature of the reaction mixture is kept between about 30° C. and about 40° C. by external cooling. The clear, yellowish reaction product is heated for further 30 minutes to about 100° C. and the solvent is then distilled off under reduced pressure; the distillate is free from isopropanol.

The distillation residue is a yellowish oil which solidifies in the cold to give a soft wax and is soluble in toluene, perchlorethylene and test benzine. On distillation under highly reduced pressure the zirconium di-isopropylate-disacetoacetic isopropyl ester boiling at 140° C. under 0.3 mm. pressure is obtained in a good yield.

Example 4

252 parts of diketene mixed with 200 parts of xylene are added dropwise, while stirring, to 284 parts of titanium tetraisopropylate dissolved in 400 parts of xylene. During the addition the clear, yellowish reaction mixture is kept at a temperature of between about 20° C. and about 30° C. by external cooling. After the mixture has been allowed to stand overnight, the solvent is distilled off under reduced pressure. The reaction product is obtained as a yellowish, viscous oil which solidifies in the cold to show a wax-like consistency; it is readily soluble in heavy gasoline, xylene and perchlorethylene.

Example 5

1 mol of the solution of aluminum ethylate, reacted with diketene, in ethylacetate obtained according to Example 1 is boiled for half an hour under reflux with 0.8 mol of stearic acid (solidification point 52° C.) dissolved in 10 times the quantity of carbon tetrachloride. The solvents are then distilled off under reduced pressure from the clear solution of the condensation product of stearic acid, aluminum ethylate and diketenes. The distillation residue of wax-like consistency is stirred at 60° C. with 2 parts of paraffin (solidification point 54° C.) and 3 parts of perchlorethylene to a clear fused mass which solidifies on cooling to a lard-like substance. A solution of the lard-like product in 30 parts of test benzine or 40 parts of carbon tetrachloride produces very good water-repellent effects on fabrics from cotton, wool, polyamide fibers or the like.

Example 6

392 parts of dibutyl diketene are mixed at about 20° C., while stirring, with a solution of 568 parts of titanium tetraisopropylate in 1000 parts of xylene, the temperature of the yellowish clear mixture being kept between about 25° C. and about 30° C. by external cooling. The self-heating is finished after about 1 hour and the clear solution thus obtained is allowed to stand overnight at about 20° C. in order to complete the reaction. The solvent is then distilled off under reduced pressure and the reaction product of the approximately analytical composition of the titanium-triisopropylate-mono-(dibutyl-acetoacetic isopropyl ester) is obtained as a yellowish oil; it is soluble in test benzine and perchlorethylene in addition to xylene.

If, instead of dibutyl-diketene, the didecyl-diketene is used and the same working method is adopted as described above, but the reaction solution is heated for further 30 minutes to 100° C. in order to complete the reaction, a wax-like reaction product is obtained which has a solidification point of about 38° C. and which is readily soluble in xylene, perchlorethylene and test benzine.

By reacting in an analogous manner 1 mol of didecyl-diketene with 1 mol of aluminum isopropylate, preferably with addition of $\frac{1}{100}$ mol of triethylamine as a catalyst, there is obtained a wax-like reaction product which has a solidification point of 35° C. and which is soluble in xylene, perchlorethylene and test benzine.

Example 7

100 parts of lauric acid are added, while stirring, to 246 parts of aluminum-sec.-butylate and the mixture thus obtained is heated to 150° C. Aluminum-semi-laurate-sec.-butylate is thus formed and the liberated sec. butanol is distilled off. The oily reaction product is dissolved in 800 parts of xylene and 42 parts of diketene are added dropwise to the solution, while stirring, the temperature being kept at about 40° C. by external cooling. A clear solution of aluminum-semilaurate-butanolate is obtained which is stable to moisture at room temperature. After the solvent has been distilled off under reduced pressure, a distillation residue of 340 parts of an oil is obtained having a solidification point of —12° C. and being soluble in xylene, test benzine and carbon tetrachloride. For the application to render textile materials water-repellent, the reaction product can be mixed by stirring, at about 50° C. with the same quantity of Indonesian paraffin and twice the quantity of perchlorethylene or test benzine to a clear fused mass which solidifies to show a lard-like consistency on cooling. The solution of 1 part of this fused mass in 20 parts of test benzine or 30 parts of perchlorethylene produces on dry cleaned garments from cotton, regenerated cellulose, wool, polyester fibers or the like very good hydrophobic effects.

If instead of lauric acid the equivalent quantity of myristic acid or oleic acid, or instead of aluminum-sec.-butylate a basic aluminum-sec.-butylate of the analytic composition of $Al(C_4H_9O)_{2.2}O$ (prepared according to Gazz. Chim. Italia, 80 (1950), page 119) are used and otherwise the same method of working is adopted, the corresponding aluminum compounds having the same properties are obtained.

Example 8

246 parts of aluminum-sec.-butylate are reacted according to the process described in Example 7 with 122 parts of benzoic acid to form the aluminum-monobenzoate-sec.-butylate and the product thus obtained is reacted at 40° C. in toluene solution with 84 parts of diketene. The clear reaction solution is then heated for further 30 minutes to 95° C. and subsequently the solvent is distilled off. A reaction product of 360 parts of aluminum - monobenzoate - monoacetoacetic - sec.-butyl ester-mono-sec.-butylate is obtained in the form of an oil which has a solidification point of about 0° C. and which is soluble in benzene, test benzine and perchlorethylene. The reaction product is a good hydrophobic agent from organic solvents in combination with hydrophobic organic substances such as paraffins or waxes. On addition of chlorinated paraffins to the impregnating solution of fireproofing effect is obtained in addition. If instead of benzoic acid the equivalent quantity or orthotoluic acid or alpha-naphthoic acid is used and the same method of working is adopted, the corresponding aluminum-compounds having similar properties are obtained.

Example 9

To 246 parts of aluminum-sec.-butylate dissolved in 1000 parts of xylene is added dropwise at 20° C., while stirring and cooling externally, the solution of 60 parts of glacial acetic acid in 300 parts of xylene. 84 parts of diketene are added dropwise at about 30° C., while stirring and cooling, to the clear solution of the aluminum-monoacetate-sec.-butylate thus formed and the whole is then stirred for another hour at 95° C. A clear solution of the aluminum-monoacetate-monoacetoacetic-sec.-butylester-mono-sec.-butylate is thus obtained. After the solvent has been distilled off under reduced pressure, the reaction product is obtained as an oil which has a solidification point of —20° C. and which is soluble in benzene, test benzine and carbon tetrachloride. If instead of glacial acetic acid the equivalent quantity of propionic acid is used and otherwise the same method of working is adopted, the corresponding aluminum-compounds of similar properties are obtained.

Example 10

42 parts of diketene are added drop by drop at about 30° C., while stirring and cooling externally, to 246 parts of aluminum-sec.-butylate dissolved in 800 parts of benzene. A clear solution of aluminum-sec.-butylate is obtained which is stabilized against the action of moisture at room temperature. After the solvent has been distilled off under reduced pressure, the stabilized aluminum-sec.-butylate is obtained in the form of an oil which solidifies in the cold to show a wax-like consistency and is readily soluble in organic solvents such as benzene, carbon tetrachloride and test benzine, the reaction product is dissolved in 1000 parts by volume of benzene and heated to 40° C., while stirring, with 300 parts of 12-hydroxy stearic acid (hydrogenated castor oil fatty acid). A clear solution of aluminum-mono-(hydroxy-stearate)-sec.-butylate is obtained which is stabilized against the action of moisture. After the solvent has been distilled off, the reaction product is obtained in the form of a viscous, soft resin which is soluble in xylene and perchloroethylene. In organic solvents the product can suitably be used as hydrophobic agent for rendering textile materials water-repellent, especially in combination with hydrophobic organic substances.

If instead of hydroxy-stearic acid the equivalent quantity of linolenic acid is used and otherwise the same method of working is adopted, a similar reaction product is obtained which is a valuable addition product for lacquers. Its compatibility with organic plastics can be improved by a subsequent heating with 1 mol of 2-ethyl-hexanol-(1)- and distilling off the liberated sec. butanol.

Example 11

30 parts of glacial acetic acid are added dropwise at about 25° C. while stirring and externally cooling to 288 parts of stabilized aluminum-sec.-butylate prepared according to the process described in Example 10 and dissolved in about 800 parts of benzene. A clear solution of stabilized aluminum-semi-acetate-sec.-butylate is formed. After the solvent has been distilled off, the product is obtained as a soft resin which is soluble in benzene, test benzine and perchlorethylene. If the product is reacted in a benzene solution at about 40° C. with 100 parts of lauric acid, a clear solution of aluminum-semi-acetate-semi-laurate-sec.-butylate is obtained. After the solvent has been distilled off, it precipitates in the form of an oil which solidifies at 30° C. and which is soluble in benzene, test benzine and perchlorethylene. In organic solvents, it is a good hydrophobic agent for textile materials especially in combination with paraffin.

If instead of lauric acid the equivalent quantity of resin acid (colophony) or benzoic acid is used and the same method of working is adopted, equally good hydrophobic agents are obtained.

Example 12

568 parts of titanium-tetra-isopropylate are treated at about 30° C., while stirring, with a mixtue of 18 parts of water and 400 parts of isopropanol. A clear solution of dimeric titanium isopropylate $Ti_2O(OC_3H_7)_6$ is obtained. After the isopropanol has been distilled off, the oily, dimeric titanium isopropylate is dissolved in 2000 parts of benzene. To the solution thus obtained, 168 parts of diketene are added dropwise at about 30° C., while stirring and cooling. A clear solution of dimeric titanium-isopropylate is obtained which is stabilized to moisture at room temperature. After the solvent has been distilled off under reduced pressure, the stabilized dimeric titanium isopropylate is obtained in the form of an oil which solidifies in the cold to a soft wax and is soluble in test benzine or perchloroethylene. It is a valuable raw material for titanium paints and in organic solvents a valuable hydrophobic agent for rendering textile materials water-repellent in combination with paraffin. Its resistance to moisture at room temperature can be improved, if required, by heating the product to about 100° C. with further 168 parts of diketene with addition of 1 part of pyridine as reaction accelerator. An oily reaction product is thus obtained which solidifies to show a wax-like consistency and is likewise soluble in test benzine.

If instead of titanium-isopropylate the equivalent quantity of titanium-butylate is used as starting material and otherwise the same process is adopted, similar raw materials are obtained which are suitable for the preparation of paints and hydrophobic agents.

Example 13

654 parts of zirconium-isopropylate dissolved in 1200 parts of carbon tetrachloride are treated at about 30° C., while stirring, with a mixture of 36 parts of water and 3000 parts of isopropanol. A clear solution of polymeric zirconium isopropylate $[ZrO(C_3H_7O)_2]_x$ is obtained. After the solvent has been distilled off under reduced pressure, the wax-like residue is dissolved in 2000 parts of benzene and the solution is reacted at about 40° C., while stirring and cooling, with 84 parts of diketene. A clear solution of polymeric zirconium isopropylate is obtained which is stabilized to moisture at room temperature. After the solvent has been distilled off under reduced pressure, the product solidifies to a soft wax which is soluble in benzene, test benzine and perchlorethylene. In organic solvents it is a good hydrophobic agent for rendering textile materials water-repellent especially in combination with paraffin. Its stability to moisture is improved by subsequently heating the product to about 100° C. with further 84 parts of diketene and on addition of 1 part of pyridine as a catalyst.

If instead of zirconium-isopropylate the equivalent quantity of zirconium-butylate is used as starting material and otherwise the same process is adopted, similar, stabilized, polymeric zirconium butylates are obtained.

Example 14

600 parts of stabilized polymeric zirconium-isopropylate obtained according to the process described in Example 13, in benzene solution are heated to about 60° C., while stirring, with 270 parts of commercial stearic acid (solidification point 54° C.). After the solvent has been distilled off, the reaction product is obtained as a soft wax which is soluble in benzene, carbon tetrachloride and test benzine and which produces very good hydrophobic effects on textile materials especially in combination with paraffin.

If instead of stearic acid the equivalent quantity of benzoic acid or lauric acid or propionic acid is used and otherwise the same method of working is adopted, similar zirconium compounds are obtained.

Example 15

84 parts of diketene are added dropwise at about 50° C., while stirring and cooling externally, to 246 parts of aluminum-tri-sec.-butylate dissolved in 800 parts of benzene. A clear solution of aluminum-di-(sec.-butylate)-mono-acetoacetic butyl ester is obtained. After the solvent has been distilled off, the product is obtained in the form of a soft resin which is readily soluble in toluene, test benzine or perchlorethylene and which is stable to atmospheric moisture at room temperature. 330 parts of the aluminum-di-(sec.-butylate)-mono-acetoacetic butylester are then dissolved in 500 parts of benzene and to the solution so obtained 119 parts of phenylisocyanate are added at about 20° C., while stirring. On self-heating to about 40° C., a clear solution of aluminum-mono-(sec.-butylate)-mono-(acetoacetic butylester)-mono-(N-phenyl-sec.-butyl-urethane) is obtained. After distilling off of the solvent, the product is obtained as a viscous resin which is readily soluble in toluene, test benzine and carbon tetrachloride.

If instead of phenylisocyanate the equivalent quantity of octadecylisocyanate is used and otherwise the same method of working is adopted, the corresponding aluminum - mono - (sec. - butylate) - mono - (acetoacetic butylester)-mono-(N-octadecyl-sec.-butylurethane) is obtained in the form of a viscous oil which is readily soluble in toluene, test benzine and carbon tetrachloride. It is a good hydrophobic agent for textiles from organic solvents, especially in combination with paraffin.

I claim:
1. The process of preparing organic metal compounds which comprises mixing an alcoholate of a low molecular weight saturated non-substituted aliphatic alcohol and a polyvalent metal selected from the group consisting of the elements of groups IIIb and IVa of the Mendelejeff Periodic System with a diketene having the empirical formula (RCO) (R'CO) wherein R and R' are alkylidene radicals containing up to 10 carbon atoms.

2. The process of preparing organic metal compounds which comprises mixing an alcoholate of a low molecular weight saturated non-substituted aliphatic alcohol and a polyvalent metal selected from the group consisting of the elements of group IIIb of the Mendelejeff Periodic System with diketene.

3. The process of preparing organic metal compounds which comprises mixing an alcoholate of a low molecular weight saturated non-substituted aliphatic alcohol and a polyvalent metal selected from the group consisting of the elements of group IVa of the Mendelejeff Periodic System with diketene.

4. The process of preparing organic metal compounds which comprises mixing an alcoholate of a low molecular weight saturated non-substituted aliphatic alcohol and a polyvalent metal selected from the group consisting of the elements of group IIIb of the Mendelejeff Periodic System with diketenes substituted by two non-substituted alkyl radicals each containing up to 10 carbon atoms.

5. The process of preparing organic metal compounds which comprises mixing an alcoholate of a low molecular weight saturated non-substituted aliphatic alcohol and a polyvalent metal selected from the group consisting of the elements of group IVa of the Mendelejeff Periodic System with diketenes substituted by two non-substituting alkyl radicals each containing up to 10 carbon atoms.

6. The process of claim 1, wherein the reaction is carried out in an inert liquid solvent.

7. The process of claim 1, wherein the reaction product is heated to an elevated temperature up to about 200° C.

8. The process of claim 1, wherein said alcoholates comprise a partially acylated polyvalent metal alcoholate, the acyl radical containing up to 18 carbon atoms.

9. The process of claim 1, wherein said aliphatic diketene comprises diketene.

10. The process of claim 1, wherein one of the components is first mixed with a portion of the other component and the remainder of the latter is subsequently added to complete its reaction.

11. The process of claim 1, including the further step of mixing the organic metal compound thus obtained with a non-substituted aliphatic monocarboxylic acid containing up to 18 carbon atoms.

12. The process of claim 1, including the further step of mixing the organic metal compound thus obtained with a non-substituted aromatic monocarboxylic acid containing up to 11 carbon atoms.

13. The process of claim 1, including the further step of mixing the organic metal compound thus obtained with an alicyclic non-aromatic carboxylic acid containing up to 20 carbon atoms.

14. The process of claim 1, including the further step of reacting the organic metal compound by mixing with water prior to mixing with a diketene.

15. The process of claim 1, including the further step of mixing the organic metal compound thus obtained with a non-substituted aliphatic monocarboxylic acid containing up to 18 carbon atoms, wherein said organic metal compound is heated prior to mixing with said aliphatic carboxylic acid.

16. The process of claim 1, including the further step of mixing the organic metal compound thus obtained with a non-substituted aromatic monocarboxylic acid containing up to 11 carbon atoms, wherein said organic metal compound is heated prior to mixing with said aromatic carboxylic acid.

17. The process of claim 1, including the further step of mixing the organic metal compound thus obtained with an alicyclic non-aromatic carboxylic acid containing up to 20 carbon atoms, wherein said organic metal compound is heated prior to mixing with said alicyclic non-aromatic carboxylic acid.

References Cited in the file of this patent

UNITED STATES PATENTS 2,108,427   Boese _____ Feb. 15, 1938

FOREIGN PATENTS 878,541   Germany _____ June 5, 1953

OTHER REFERENCES

Chick et al.: "Chemical Society Journal," 97, 1978–2000 (1910).
Hurd et al.: "J.A.C.S.," 58, 962–68 (1936).
Boese: "Ind. Eng. Chem.," 32, 16–22 (1940).
Triebs et al.: "Am. der Chem.," 577, 129–138 (130, 138), (1952).